(12) United States Patent
Copeland (10) Patent No.: US 10,596,751 B1
(45) Date of Patent: Mar. 24, 2020

(54) METHOD OF MANUFACTURING BELL SOCKETED PLASTIC PIPES

(71) Applicant: McWane, Inc., Birmingham, AL (US)

(72) Inventor: Daniel A. Copeland, Bessemer, AL (US)

(73) Assignee: MCWANE, INC., Birmingham, AL (US)

( * ) Notice: Subject to any disclaimer, the term of this patent is extended or adjusted under 35 U.S.C. 154(b) by 218 days.

(21) Appl. No.: 14/817,923

(22) Filed: Aug. 4, 2015

(51) Int. Cl.
| | |
|---|---|
| *B29C 57/02* | (2006.01) |
| *F16L 21/03* | (2006.01) |
| *B29C 57/06* | (2006.01) |
| *B29K 105/00* | (2006.01) |

(52) U.S. Cl.
CPC ............ *B29C 57/025* (2013.01); *B29C 57/06* (2013.01); *F16L 21/03* (2013.01); *B29K 2105/258* (2013.01)

(58) Field of Classification Search
CPC .... B29C 57/02; B29C 57/025; F16L 19/0283; F16L 21/025; F16L 21/03; F16L 21/035
See application file for complete search history.

(56) References Cited

U.S. PATENT DOCUMENTS

| | | | | |
|---|---|---|---|---|
| 3,377,659 A | * | 4/1968 | Hucks, Jr. ............... | B29C 57/02 425/392 |
| 3,539,205 A | | 11/1970 | Johnson et al. | |
| 3,632,732 A | * | 1/1972 | Osterhagen et al. .... | B29D 1/00 264/312 |
| 3,749,543 A | * | 7/1973 | Stansbury ............... | B29C 57/02 249/184 |
| 3,776,682 A | * | 12/1973 | Parmann ............... | B29C 57/025 425/384 |
| 3,989,440 A | * | 11/1976 | Acda ....................... | B29C 57/02 264/318 |
| 4,625,383 A | * | 12/1986 | Vassallo ................ | B29C 57/025 264/296 |
| 4,643,658 A | * | 2/1987 | Gordon ................. | B29C 57/025 425/110 |
| 4,723,905 A | * | 2/1988 | Vassallo ................ | B29C 57/025 425/392 |
| 4,826,028 A | * | 5/1989 | Vassallo ................ | B29C 57/025 277/615 |
| 5,306,371 A | * | 4/1994 | Ramey .................. | B29C 53/824 156/169 |

(Continued)

*Primary Examiner* — Matthew J Daniels
*Assistant Examiner* — Andrew D Graham
(74) *Attorney, Agent, or Firm* — C. Brandon Browning; Maynard, Cooper & Gale, PC (57) ABSTRACT

The present disclosure generally pertains to methods for manufacturing an improved plastic pipe. One method includes the steps of: providing a plastic pipe; heating a plastic pipe; inserting a mandrel into the heated plastic pipe to form a bell socket end, wherein the mandrel includes a Rieber gasket and a dummy gasket spanning the outer surface of the mandrel; cooling the plastic pipe; and removing the mandrel from the plastic pipe, wherein the Rieber gasket and dummy gasket remain within a gasket cavity formed in the newly-formed bell socket end of the plastic pipe. The method results in the bell socket end of the pipe having an interior diameter greater than the exterior diameter of the opposing, spigot end of the pipe, wherein the bell socket end further includes a gasket cavity with a greater diameter than the remainder of the bell socket end.

18 Claims, 9 Drawing Sheets

(56) References Cited

U.S. PATENT DOCUMENTS

| | | | | |
|---|---|---|---|---|
| 6,328,309 B1* | 12/2001 | Corbett, Jr. | B29C 57/025 | 264/275 |
| 10,436,359 B2* | 10/2019 | Copeland | F16L 47/08 | |
| 2002/0017790 A1* | 2/2002 | Holmes, IV | F16L 21/08 | 285/337 |
| 2004/0026830 A1* | 2/2004 | Schnallinger | B29C 57/025 | 264/320 |
| 2005/0046189 A1* | 3/2005 | Corbett, Jr. | F16L 37/0845 | 285/374 |
| 2006/0119100 A1* | 6/2006 | Jones | F16L 37/0925 | 285/374 |
| 2006/0181031 A1* | 8/2006 | Corbett, Jr. | F16L 21/03 | 277/616 |
| 2008/0284166 A1* | 11/2008 | Darce | F16L 21/03 | 285/337 |
| 2009/0152863 A1* | 6/2009 | Steinbruck | F16L 37/148 | 285/24 |
| 2010/0059940 A1* | 3/2010 | Monteil | F16L 21/03 | 277/314 |
| 2010/0264645 A1* | 10/2010 | Jones | F16L 37/0925 | 285/105 |
| 2011/0236520 A1* | 9/2011 | Tabanelli | B29C 57/025 | 425/392 |
| 2013/0113208 A1* | 5/2013 | Liao | F16L 19/06 | 285/339 |
| 2014/0374994 A1* | 12/2014 | Monteil | F16L 17/035 | 277/314 |
| 2015/0152990 A1* | 6/2015 | Lopez-Chaves | F16L 21/03 | 277/609 |
| 2016/0223109 A1* | 8/2016 | Lopez-Chaves | F16J 15/022 | |

* cited by examiner

METHOD OF MANUFACTURING BELL SOCKETED PLASTIC PIPES

FIELD OF INVENTION

The present invention relates generally to the manufacture of plastic pipes, and more particularly, to methods of manufacturing plastic pipes including a spigot end and an opposing bell socket end, wherein the bell socket end contains a cavity configured to accept at least one gasket.

BACKGROUND OF THE INVENTION

Pipes formed from thermoplastic materials including, but not limited to, polyethylene, polypropylene and PVC, are used in a variety of industries. To form a joint between sections of plastic pipe, the spigot end of one pipe is inserted within the bell or socket end of a second pipe. Such socket and spigot pipe joints between plastic pipes are well known in the art. For example, U.S. Pat. No. 3,539,205 discloses a pipe joint including a plastic pipe with a bell end portion further having an annular gasket seat portion for containing an annular gasket. The spigot end portion of another pipe is inserted into the bell end portion and through the annular gasket wherein the annular gasket forms a seal between the bell end portion and the spigot end portion. The use of a gasket not only improves the seal of the pipe joint, but also may allow a restrained or unrestrained pipe joint by the use of particular types of gaskets.

The formation of a thermoplastic pipe with a bell socket end containing a gasket cavity, however, typically requires the use of expensive machinery, such as expandable mandrels, to achieve the differential internal diameters of the bell socket. Therefore, a need exists for a less expensive methodology for the production of such thermoplastic pipes, which contain not only a bell socket end, but also a gasket cavity.

SUMMARY OF THE INVENTION

The present disclosure is directed to an improved method of manufacturing plastic pipes, wherein such pipes have a bell socket end and a second, opposing male or spigot end, such that the spigot end of one pipe is configured to fit into the bell socket end of a second pipe.

The present disclosure is also directed to an improved plastic pipe manufacturing method wherein a gasket cavity is formed in the bell socket end of the plastic pipe.

The present disclosure is also directed to an improved, simpler method of manufacturing plastic pipes using less expensive, non-expandable mandrels compared to more expensive, expandable mandrels used in conventional pipe manufacturing methods.

The present disclosure is also directed to an improved plastic pipe manufacturing method wherein the manufactured pipes are configured to maintain an airtight and watertight seal, including when such pipes are under high pressure.

According to one aspect of the invention, there is provided a method of making a plastic pipe, the method including arranging a pair of annular rings about a non-expandable mandrel having an outer diameter, heating a first plastic pipe having an inner diameter that is less the outer diameter of the mandrel, inserting the mandrel into the first plastic pipe and thereby forming a bell socket in an end of the first pipe, the bell socket including an annular cavity formed by and about the pair of annular rings. Thereafter, the mandrel is removed from the bell end while leaving the pair of annular rings in the annular cavity of the bell socket. When desired, a first annular ring of the pair of annular rings is replaced with a gasket including a restraining member having a radially inward-extending tooth, wherein an inner diameter of the gasket measured from a tip of the tooth is less than the outer diameter of the mandrel.

According to another aspect of the invention, there is provided a method of making a plastic pipe including arranging a dummy ring and an unrestrained gasket about a non-expandable mandrel having an outer diameter, heating a first plastic pipe having an inner diameter that is less the outer diameter of the mandrel, inserting the mandrel into the first plastic pipe thereby forming a bell socket in an end of the first pipe, the bell socket including an annular cavity formed by and about the dummy ring and the unrestrained gasket, and removing the mandrel from the bell end while leaving the dummy ring and the unrestrained gasket in the annular cavity of the bell socket. Thereafter, the dummy ring is removed from the annular cavity which forms an annular void in the annular cavity. When desired, a second gasket is manual placed into the annular void. The second gasket includes a plurality of circumferentially arranged restraining segments embedded therein and a plurality of teeth extending radially inward from the plurality of circumferentially arranged restraining segments.

The inner diameter of the second gasket measured from tips of two of the teeth of the plurality of teeth is less than the outer diameter of the mandrel.

Other objects, features and advantages of the present disclosure will become apparent from the following detailed description given with reference to the accompanying figures.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to methods for manufacturing an improved plastic pipe. One method includes the steps of: providing a plastic pipe; heating a plastic pipe; inserting a mandrel into the heated plastic pipe to form a bell socket end, wherein the mandrel includes a Rieber gasket and a dummy gasket spanning the outer surface of the mandrel; cooling the plastic pipe; and removing the mandrel from the plastic pipe, wherein the Rieber gasket and dummy gasket remain within a gasket cavity formed in the newly-formed bell socket end of the plastic pipe. The method results in the bell socket end of the pipe having an interior diameter greater than the exterior diameter of the opposing, spigot end of the pipe, wherein the bell socket end further includes a gasket cavity with a greater diameter than the remainder of the bell socket end.

The use of any and all examples, or exemplary language ("e.g.," "such as," or the like) provided herein, is intended merely to better illuminate the embodiments and does not pose a limitation on the scope of the embodiments.

As used herein, "alloy" means pure metals and metals including incidental impurities and/or purposeful additions of metals and/or non-metals. For example, alloy may mean aluminum. Other examples of alloys include brass, bronze, copper, duralumin, Inconel, nickel, steel, stainless steel, titanium, other alloys known to those skilled in the art, and combinations of the same.

As used herein, "plastic" means a thermoplastic, a thermoset plastic, polyvinyl chloride (PVC) or other extruded high molecular mass, organic polymer, and other plastics known in the art.

As used herein, "Rieber gasket" means a gasket containing a ring of alloy, such as an alloy wire, on the interior of the gasket and a flexible material, such as rubber, on the exterior of the gasket.

As used herein, "rubber" means any natural, cured, reclaimed, vulcanized and synthetic elastomers including, but not limited to, acrylic rubber, acrylonitrile butadiene rubber (nitrile or NBR), butyl rubber (IIR), ethylene propylene diene monomer (EPDM), fluoroelastomer rubber, hydrogenated nitrile rubber, styrene-butadiene rubber (SBR), silicone, and like flexible materials known in the art having elastic memory.

Throughout the accompanying drawings, identical or similar parts are represented by the same reference numerals and characters.

Figure 1:
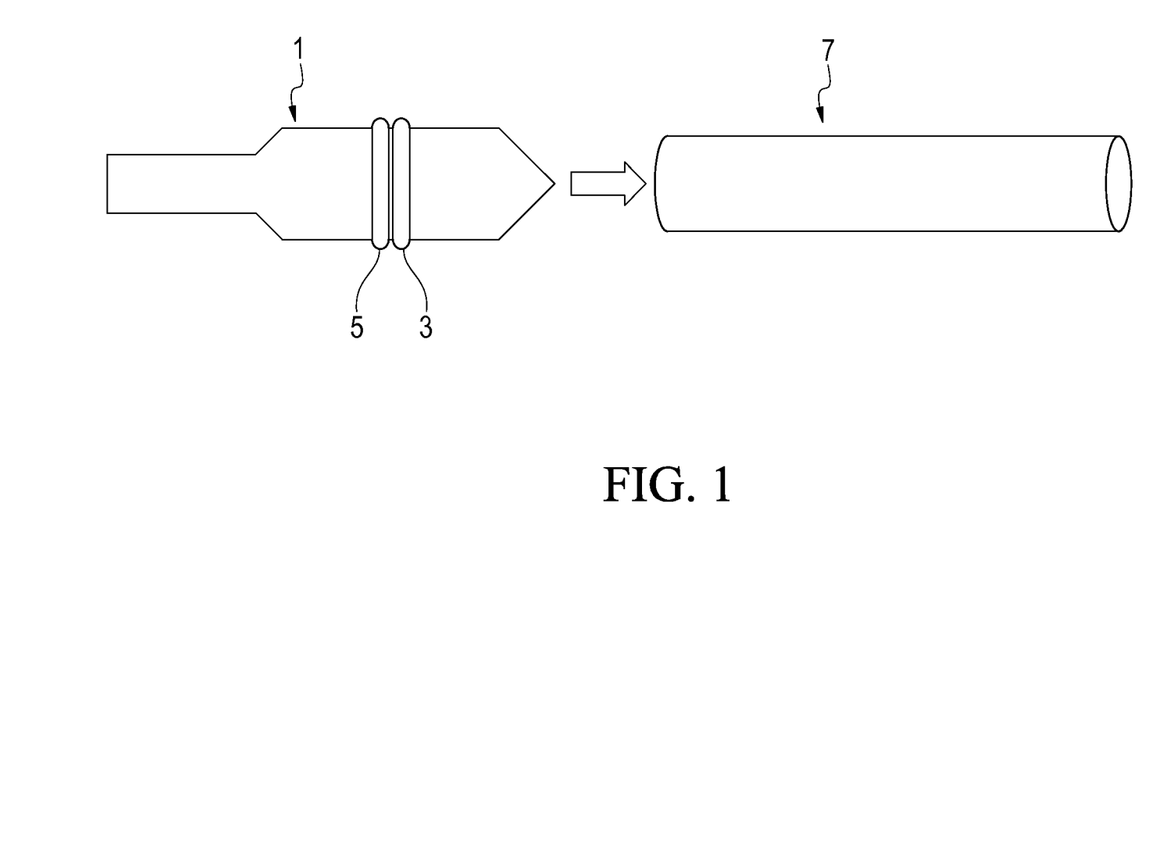
FIG. 1 depicts a mandrel, upon which a Rieber gasket and a dummy gasket are located, prior to insertion of the mandrel into a heated plastic pipe.

FIG. 1 depicts a non-expandable mandrel 1 and a plastic pipe 7. The mandrel 1 is generally cylindrical in shape. In certain embodiments, at least one end of the mandrel 1 is tapered such that, for a certain length from the end of the mandrel 1, the circumference of the mandrel 1 decreases with increasing proximity to its end. The tapered end enables the mandrel 1 to be inserted into a plastic pipe 7 which has a smaller interior diameter than the greatest outer diameter of the mandrel 1. In certain embodiments, the mandrel 1 is comprised of an alloy.

Figure 2:
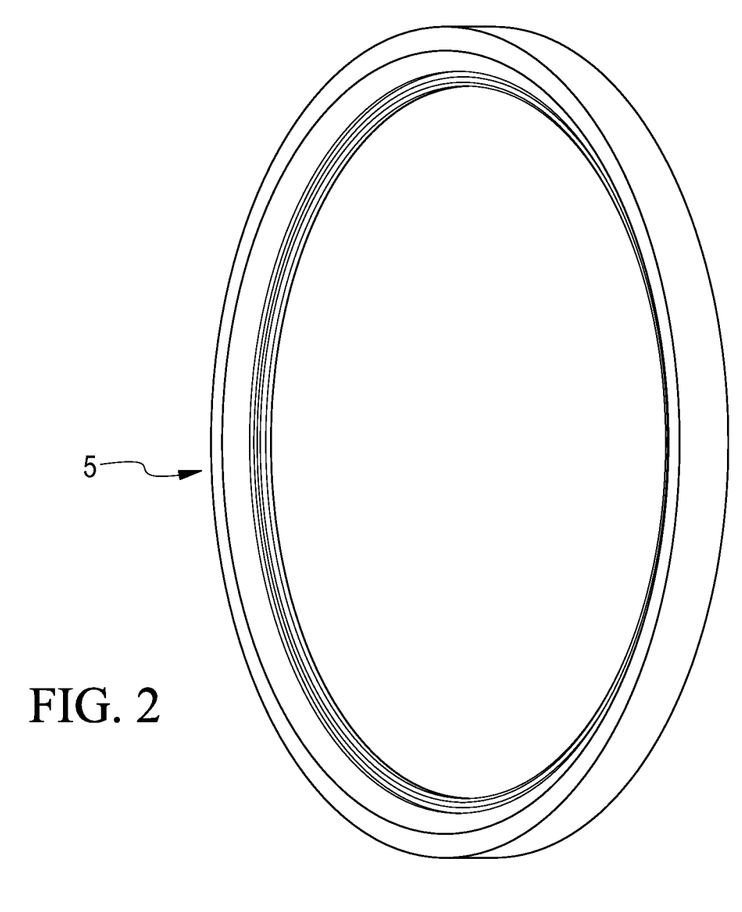
FIG. 2 is a perspective view of the dummy ring of FIG. 1.

The mandrel 1 includes a Rieber gasket 3 spanning the outer circumference of the mandrel 1. The Rieber gasket 3 is adjacent to a dummy gasket 5, which is also spans the outer circumference of the mandrel 1. The dummy gasket 5 is a gasket comprising a ring of rubber with a smooth interior surface configured to contact the exterior surface of the mandrel 1. An exemplary embodiment of a dummy gasket is depicted in FIG. 2. In certain embodiments, the Rieber gasket 3 and dummy gasket 5 are compressible. In certain embodiments, the Rieber gasket 3 and dummy gasket 5 are elastomeric. When adjacent to one another, the Rieber gasket 3 and dummy gasket 5 form a generally semi-circular protrusion spanning the exterior surface of the mandrel 1.

Figure 3:
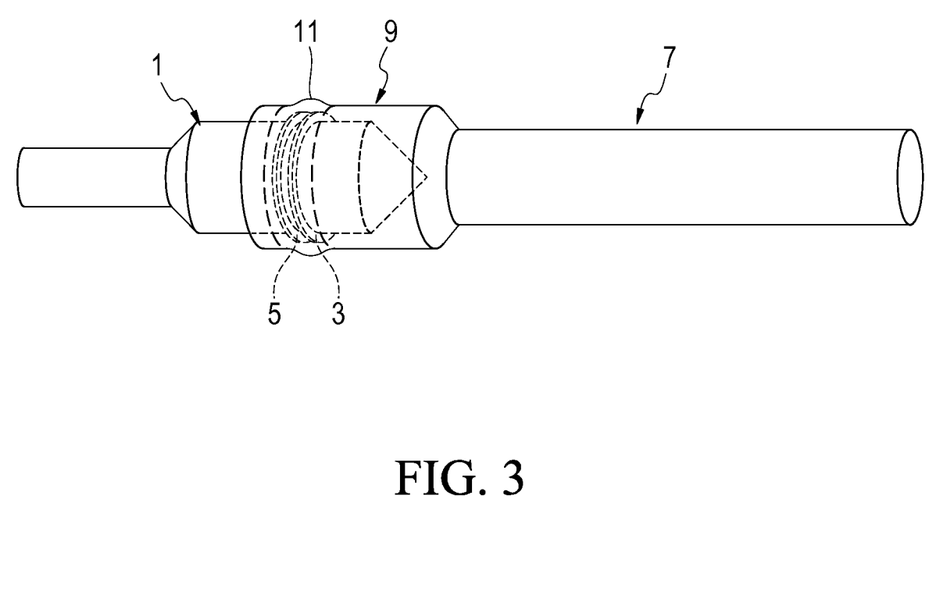
FIG. 3 depicts forming of a bell socket within the end of the plastic pipe of FIG. 1.
Figure 4:
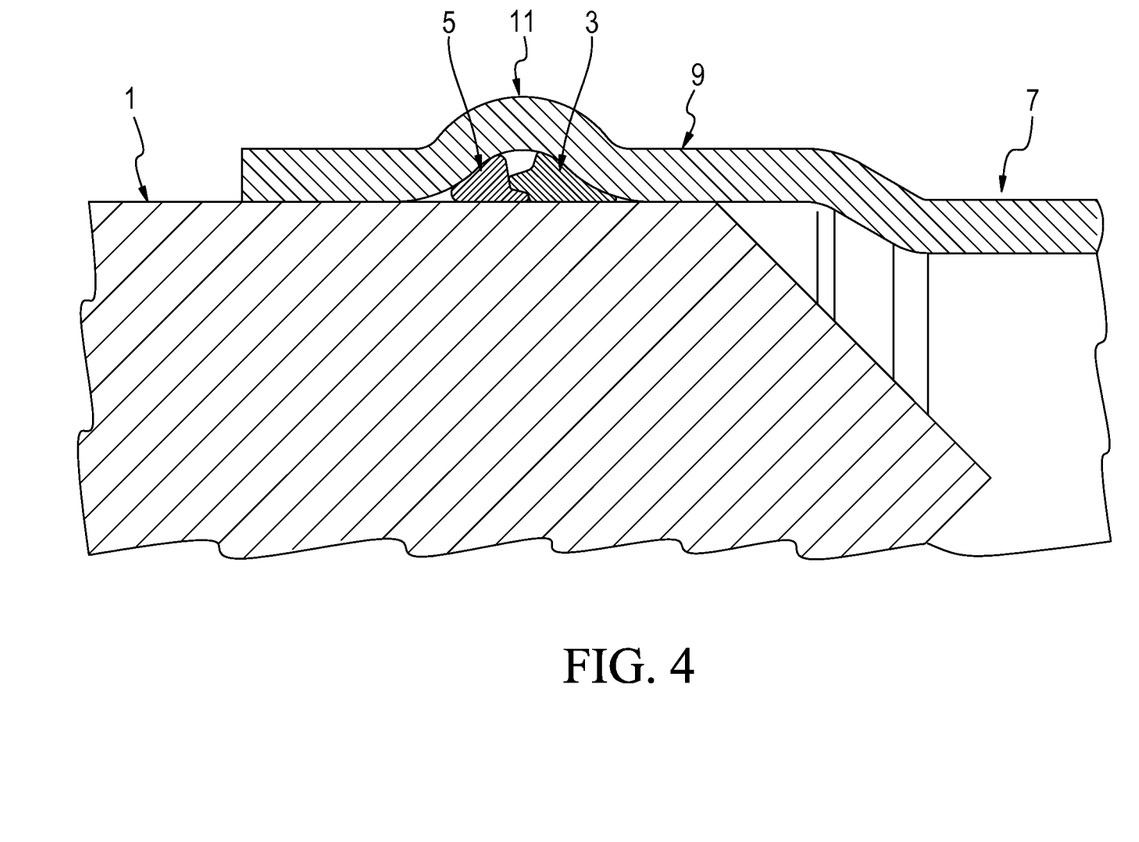
FIG. 4 is a sectional view of the mandrel, Rieber gasket, dummy gasket and plastic pipe of FIG. 1 showing the mandrel inserted into the plastic pipe for forming the bell socket of FIG. 3.
Figure 5:
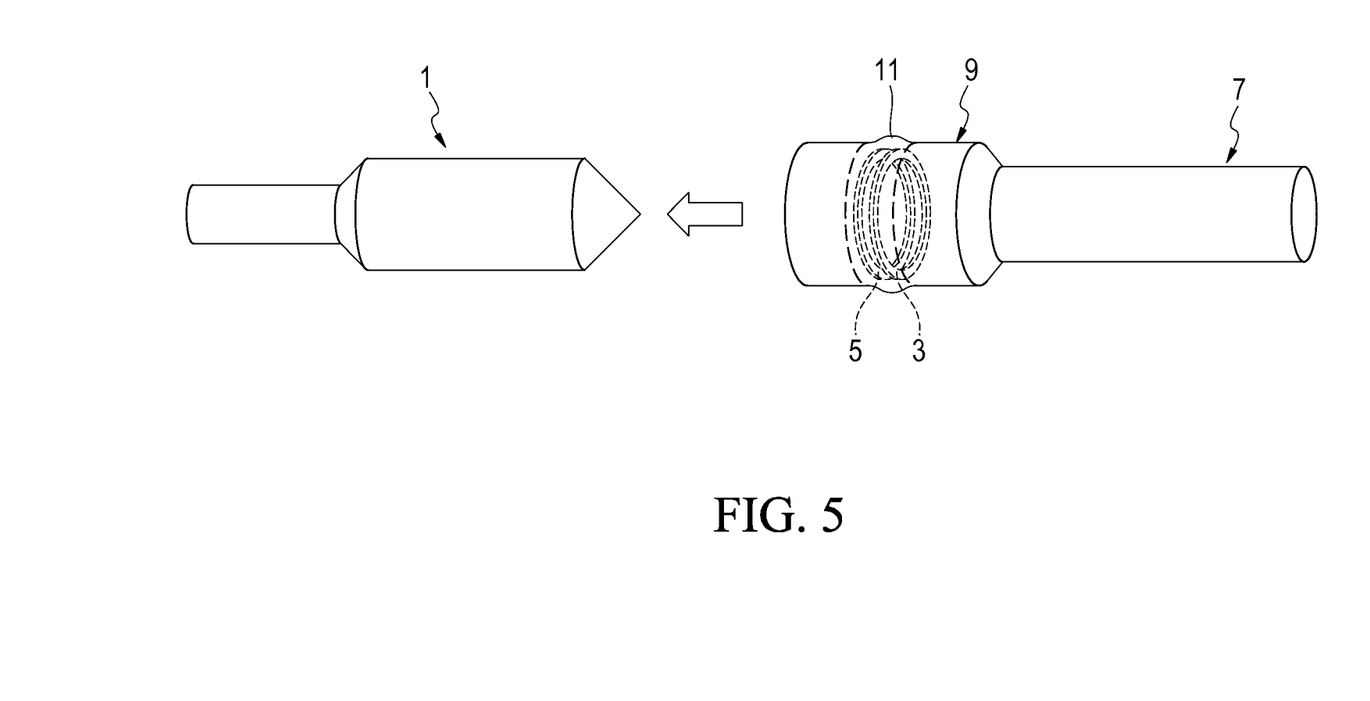
FIG. 5 depicts removing the mandrel from the bell socket of FIG. 4 and locating the Rieber gasket and the dummy gasket within the bell socket.

Referring to FIGS. 3 through 5, there is depicted a method of forming within plastic pipe 7 a bell socket end 9 having a gasket cavity 11. The method includes heating at least one end of the plastic pipe 7 and inserting the mandrel 1, Rieber gasket 3 and dummy gasket 5 into the heated plastic pipe 7. Methods of heating and cooling plastic pipe 7 to a desired temperature are known in the art and include, without limitation, the use of heating and cooling stations, respectively. For example, one end of the plastic pipe 7 may be inserted into a heating station prior to insertion of the mandrel 1 into such end. Heating the plastic pipe 7 increases the malleability of the plastic pipe 7 and allows the plastic pipe 7 to slide and form over the exterior surface of the mandrel 1. Thus, as the inner diameter of the heated plastic pipe expands as the mandrel 1 slides along the inner surface of the plastic pipe 7, the plastic pipe adopts the shape of the mandrel 1, the Rieber gasket 3 and the dummy gasket 5. In this manner, the bell socket end 9 is formed within the plastic pipe with the gasket cavity 11 formed by the outer surfaces of the Rieber gasket 3 and dummy gasket 5. Thereafter, the plastic pipe 7 is cooled to harden the plastic and the mandrel 1 withdrawn from the plastic pipe 7.

Methods of inserting and removing the mandrel 1 from the plastic pipe 7 are known in the art and include, without limitation, the use of a hydraulic piston attached to the mandrel 1. For example, a hydraulic piston may be used to push the mandrel 1 into the plastic pipe 7 at a desired rate and pressure. Conversely, the hydraulic piston may be reversed to withdraw the mandrel 1 from the plastic pipe 7. The hydraulic piston apparatus may be configured with a sensor to detect force imparted on the plastic pipe 7 such that the hydraulic piston does not exceed a predetermined level of a force, thereby preserving the structural integrity of the plastic pipe 7. The hydraulic piston may also be programmed to insert the mandrel 1 a predetermined distance into the plastic pipe 7, allowing the formation of a bell socket of desired dimensions.

Figure 6:
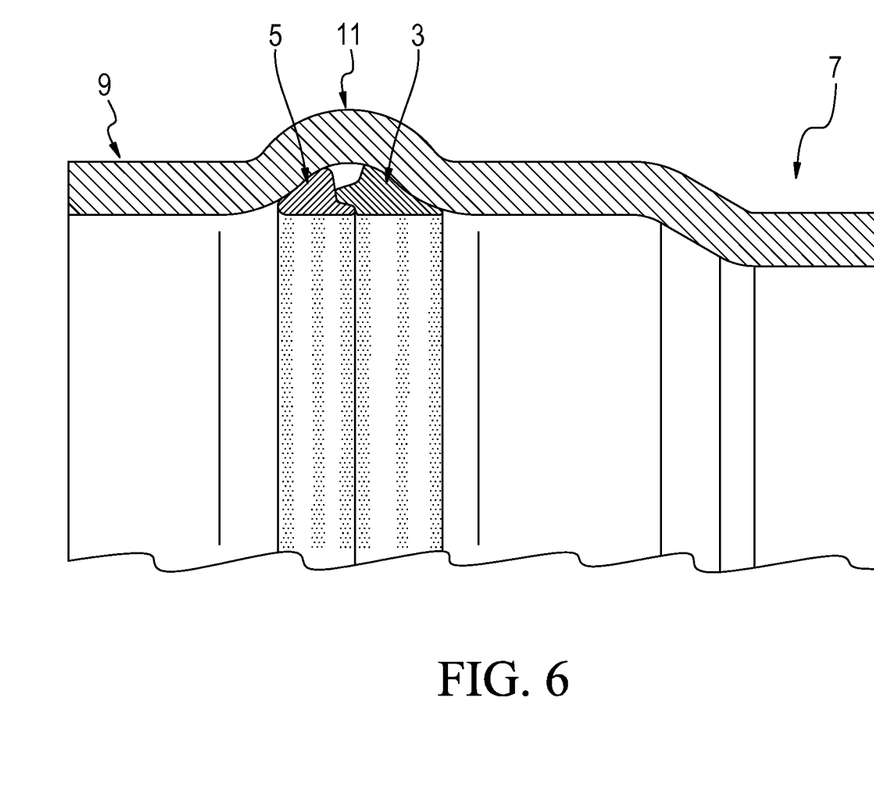
FIG. 6 is a sectional view of the bell socket of FIG. 5.

FIG. 6 depicts the Rieber gasket 3 and the dummy gasket 5 located within the gasket cavity 11 of the bell socket end 9 of the plastic pipe 7. The gasket cavity 11 formed by sliding the plastic pipe 7 over the Rieber gasket 3 and dummy gasket 5 has a semi-circular cross-section and spans the entire circumference of the bell socket end 9 of the plastic pipe 7.

Figure 7:
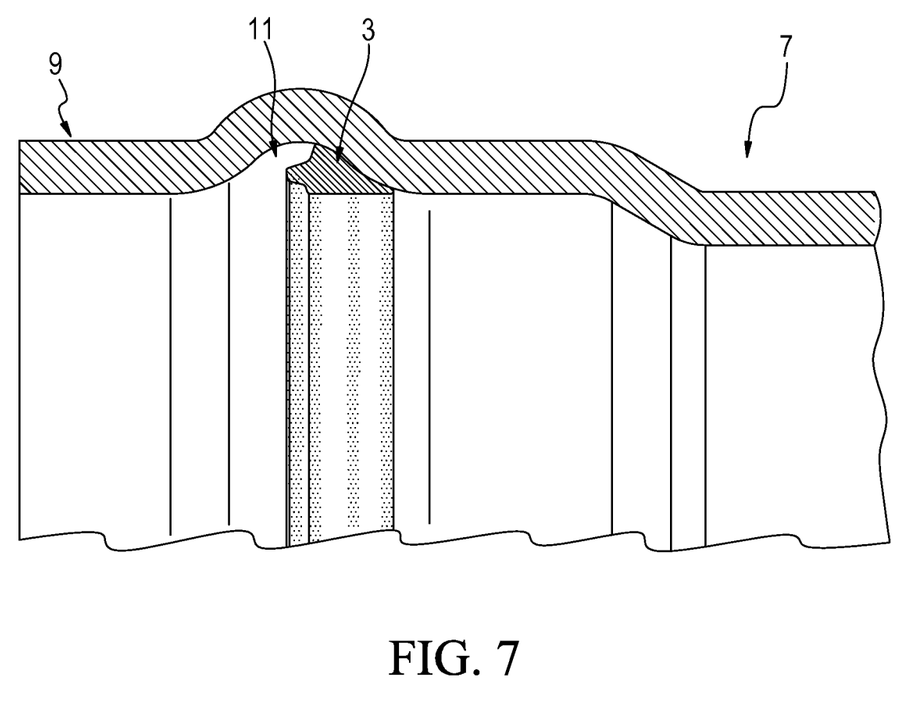
FIG. 7 is a sectional view of the bell socket of FIG. 6 showing an annular groove formed by the removal of the dummy gasket from the bell socket.
Figure 8:
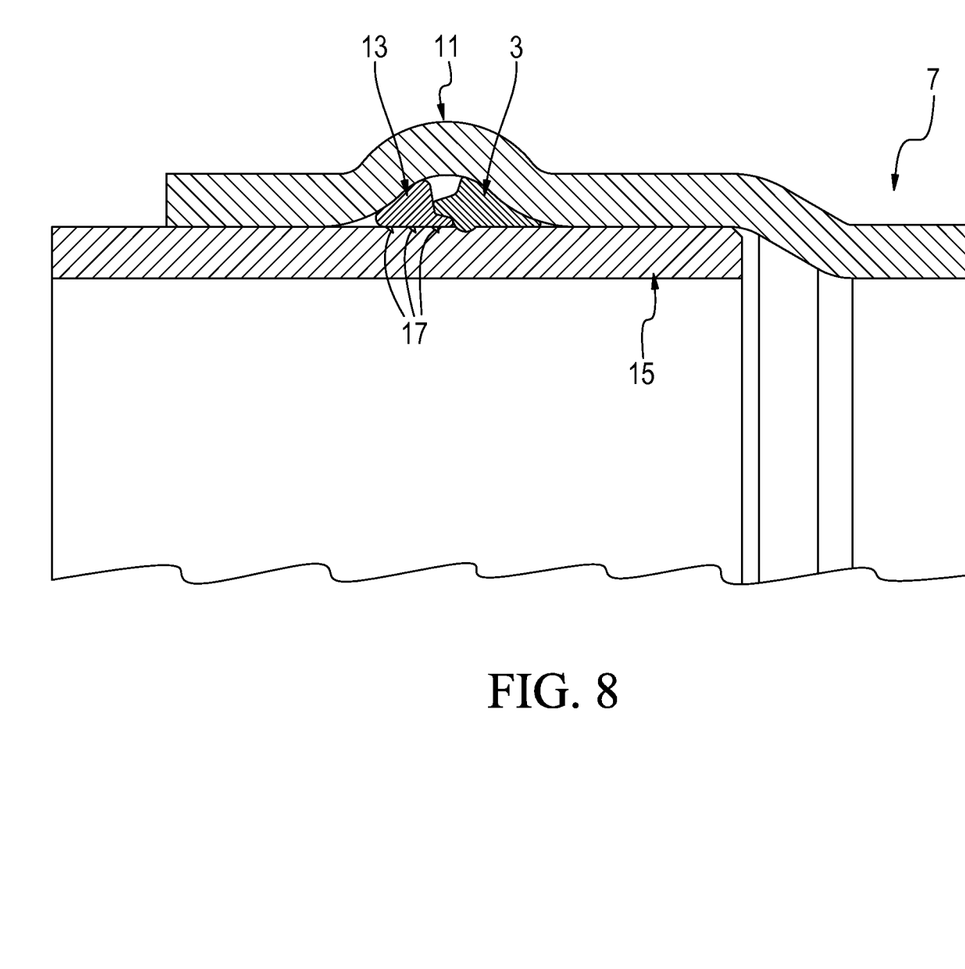
FIG. 8 is a sectional view of the bell socket of FIG. 7 showing a restraining gasket placed within the annular groove with a spigot end of a second pipe inserted into the bell socket and through the restraining gasket.

In certain embodiments, the Rieber gasket 3 and dummy gasket 5 remain in the gasket cavity 11 of the bell socket end 9. In other embodiments, as depicted in FIGS. 7 and 8, the method further includes removal of the dummy gasket 5 from the gasket cavity 11 and insertion of a restraining gasket 13 into the gasket cavity 11 (See FIG. 6). Removal of the dummy gasket 5 from the gasket cavity 11 and insertion of the restraining gasket 13 into the gasket cavity 11 can be performed manually.

Figure 9:
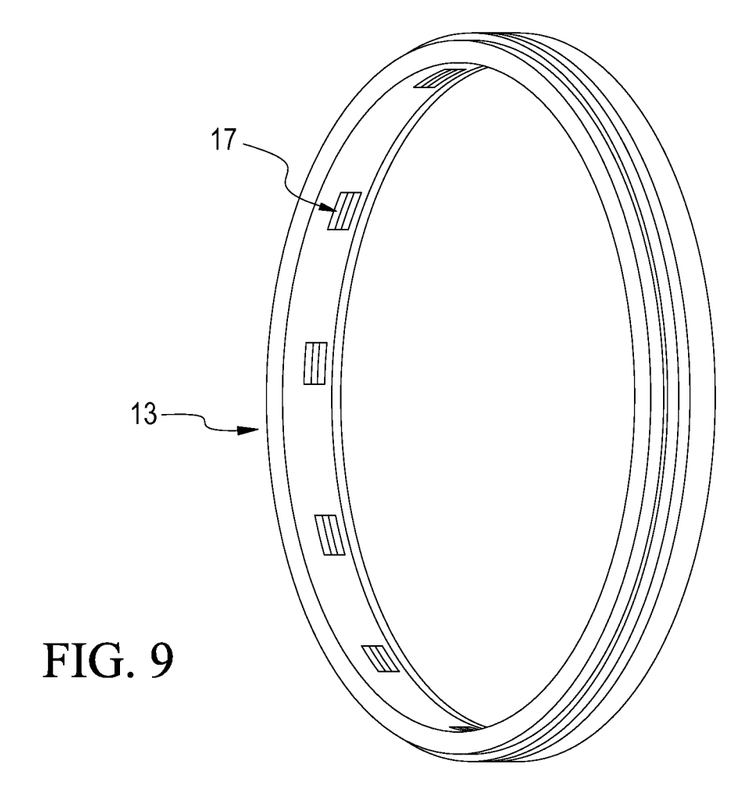
FIG. 9 is a perspective view of the restraining gasket of FIG. 8.

Referring to FIGS. 8 and 9, restraining gasket 13 is constructed of a compressible and/or elastomeric material such as rubber. The restraining gasket 13 includes a foot portion including a plurality of toothed-restraints 17 evenly and circumferentially spaced and embedded within the inner surface of the restraining gasket 13 such that the toothed-restraints 17 protrudes from the restraining gasket 13. In certain embodiments, the toothed-restraints 17 are less compressible than the remainder of the restraining gasket 13. The number of toothed-restraints 17 in a restraining gasket 13 may be adjusted depending on the internal pressurization of the pipes. For example, higher pressurized pipes may require more toothed-restraints 17 than lower pressurized pipes. In certain embodiments, each toothed-restraint 17 has one tooth. In other embodiments, each toothed-restraint 17 has multiple teeth.

The toothed-restraints 17 of the restraining gasket 13 are configured such that, once engaged with the outer surface of a spigot end of a second pipe 15, as depicted in FIG. 8, they resist or impinge the withdrawal of such second pipe 15. For example, the teeth of the toothed-restraint 17 may be angled away from the opening bell socket end 9 of the pipe 7 such that the resistance the restraining gasket 13 imparts upon the second pipe 15 is significantly greater when the second pipe 15 is withdrawn from, compared to when the second pipe 15 is inserted into, the pipe 7. This greater resistance is caused not only by the point ends of each tooth of the toothed-restraints 17 being directed into the surface of the second pipe 15, but also from the compression of the restraining gasket 13 caused by such withdrawal of the second pipe 15. In certain embodiments, the toothed-restraints 17 are composed of an alloy. In certain embodiments, the toothed-restraints 17 are composed of a composite. In certain embodiments, the toothed-restraints 17 are composed of rubber.

A significant benefit of the pipe manufacturing method described herein is that such method allows the use of a non-expandable mandrel—which is less expensive than conventional, expandable mandrels—to form the bell socket and gasket cavity. Further, the dummy ring may be left in the pipe to pressure test the pipe and be removed prior to or after shipping. For applications where unrestrained joints are suitable, the dummy ring may be left in the gasket cavity.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The various methods and embodiments described herein are exemplary and are not intended to limit the interpretation of this disclosure. Various other methods and embodiments for the manufacture of pipe are possible.

Now, therefore, the following is claimed:

1. A method of making a plastic pipe, the method comprising:
    arranging a pair of annular rings about a mandrel having an outer diameter,
    heating a first plastic pipe having an inner diameter that is less than the outer diameter of the mandrel,
    inserting the mandrel into the first plastic pipe thereby forming a bell socket in an end of the first plastic pipe, the bell socket including an annular cavity formed by and about the pair of annular rings,
    removing the mandrel from the bell socket while leaving the pair of annular rings in the annular cavity of the bell socket,
    removing a first annular ring of the pair of annular rings from the annular cavity after removing the mandrel from the bell socket, while leaving a second annular ring of the pair of annular rings in the annular cavity, and
    replacing the first annular ring of the pair of annular rings with a gasket including a restraining member having a radially inward-extending tooth,
    wherein an inner diameter of the gasket measured from a tip of the tooth is less than the outer diameter of the mandrel.

2. The method of claim 1 wherein the pair of annular rings are compressible.

3. The method of claim 2 wherein the second annular ring of the pair of annular rings is stiffened by an embedded strip of metal.

4. The method according to claim 3 wherein the second annular ring is a Rieber gasket.

5. The method of claim 3 including inserting a spigot end of a second pipe into the bell socket of the first plastic pipe and through an opening defined by the gasket and an opening defined by the Rieber gasket.

6. The method of claim 5 wherein the restraining member is composed of metal.

7. The method of claim 1 wherein the mandrel is non-expandable.

8. The method according to claim 1 wherein the annular cavity formed by and about the pair of annular rings has an inner diameter that is greater than the outer diameter of the mandrel.

9. A method of making a plastic pipe, the method comprising:
    arranging a dummy ring and an unrestrained gasket about a mandrel having an outer diameter,
    heating a first plastic pipe having an inner diameter that is less than the outer diameter of the mandrel,
    inserting the mandrel into the first plastic pipe thereby forming a bell socket in an end of the first plastic pipe, the bell socket including an annular cavity formed by and about the dummy ring and the unrestrained gasket,
    removing the mandrel from the bell socket while leaving the dummy ring and the unrestrained gasket in the annular cavity of the bell socket, and thereafter,
    removing the dummy ring from the annular cavity, thereby forming an annular void in the annular cavity, while leaving the unrestrained gasket in the annular cavity.

10. The method of claim 9 further comprising inserting a second gasket into the annular void.

11. The method of claim 10 wherein the second gasket includes a plurality of circumferentially arranged restraining segments embedded therein and a plurality of teeth extending radially inward from the plurality of circumferentially arranged restraining segments.

12. The method according to claim 11 wherein an inner diameter of the second gasket measured from tips of two of the teeth of the plurality of teeth is less than the outer diameter of the mandrel.

13. The method of claim 11 including inserting a spigot end of a second pipe into the bell socket of the first plastic pipe and through an opening defined by the second gasket and the unrestrained gasket.

14. The method of claim 9 wherein the mandrel is non-expandable.

15. A method of making a plastic pipe, the method comprising:
    arranging a rubber gasket about a mandrel,
    inserting the mandrel into a first plastic pipe thereby forming a bell socket in an end of the first plastic pipe, the bell socket including an annular cavity formed by and about the rubber gasket, removing the mandrel from the bell socket while leaving the rubber gasket in the annular cavity of the bell socket, removing the rubber gasket from the annular cavity after removing the mandrel from the bell socket, and replacing the rubber gasket with a second gasket including a restraining member having a radially inward-extending tooth.

16. The method of claim 15 wherein the mandrel is non-expandable.

17. The method of claim 15 wherein a Rieber gasket is arranged about the mandrel adjacent to the rubber gasket so that the annular cavity is formed by and about the rubber gasket and the Rieber gasket.

18. The method of claim 17 including inserting a spigot end of a second pipe into the bell socket of the first plastic pipe and through an opening defined by the second gasket and an opening defined by the Rieber gasket.

* * * * *